INVENTORS.
EDWARD W. VERES
WALTER E. DRAXLER
HERBERT G. HANSON
ROBERT E. POETHIG
BY Harbaugh and Thomas
ATT'YS.

INVENTORS.
EDWARD W. VERES
WALTER E. DRAXLER
HERBERT G. HANSON
ROBERT E. POETHIG

BY

ATT'YS.

April 21, 1970   E. W. VERES ET AL   3,507,098
AIR LINE FILTER

Original Filed July 3, 1963   3 Sheets-Sheet 3

INVENTORS.
EDWARD W. VERES
WALTER E. DRAXLER
HERBERT G. HANSON
ROBERT E. POETHIG

BY
ATT'YS

United States Patent Office 3,507,098
Patented Apr. 21, 1970

3,507,098
AIR LINE FILTER
Edward W. Veres, Walter E. Draxler, and Herbert G. Hanson, Arlington Heights, and Robert E. Poethig, Glenview, Ill., assignors, by mesne assignments, to Astro Controls, Inc., Chicago, Ill., a corporation of Delaware
Original application July 3, 1963, Ser. No. 292,597. Divided and this application Aug. 18, 1966, Ser. No. 594,293
Int. Cl. B01d 39/00
U.S. Cl. 55—219            11 Claims

ABSTRACT OF THE DISCLOSURE

Air line filter drain in which a pressure reponsive reciprocating member driving a drain valve is subjected side to differential pressures derived from relative areas subjected independently to air line pressure and atmospheric pressure, and is subjected over the major area of the other side to a pressure which is changing from air line pressure to atmospheric pressure as controlled by a float driven valve to vent the other side to atmosphere whereby bowl pressure both opens and closes the drain valve.

---

The present application is a division of our application Ser. No. 292,597, filed July 3, 1963. Said application is now Patent No. 3,378,993.

The present invention relates to a compressed air line filter and drain and particularly to one which automatically separates, collects and drains from an air line unedesirable materials such as condensation, dust and rust and indicates when its efficiency becomes materially impaired, so that devices powered by compressed air will not be damaged thereby and will be powered at their top efficiency with minimum servicing of the air line.

The industry has somewhat standardized on the filter heights and diameters including the bowl size for each "pipe size" of an air line, and, in those conventional installations where filters attain a required efficiency, there is little room left in the bowl for a drain device. Accordingly, either the filter is reduced in size and efficiency or the overall height of the filter is increased with special bodies or bowls being supplied to accommodate an adequate drain device in the bowl.

In the present invention a standard size filter device is supplied with an improved full efficiency filter system with or without an improved automatic drain and the automatic drain with or without a screen cage for bowls as small as those having a two inch inside diameter. Moreover, a full view device is provided indicating when the filter efficiency falls below a predetermined efficiency as when dust collected begins to retard air flow volume.

A principal object of the invention is to provide a full rated capacity filtration device and a compact, highly efficient and inexpensive automatic drain, both protectively disposed in a quickly removable bowl of a standard size otherwise interchangeable with bowls on other air line equipment.

Moreover, when such is indicated to be desirable, the bowl can be quickly removed and flushed clean and the filter also can be quickly removed, cleaned or replaced and returned to operation in seconds, instead of minutes, thereby greatly reducing the air line shutdown times.

A further object of the invention is to provide an improved filter device and pilot valve arrangement operated with minimal air flow and buoyancy forces to control positive discharge of accumulated condensation and debris under air pressures ranging from 10 to 200 p.s.i., with or without the air flowing.

A further object of the invention is to provide an improved filter device of the type described which is relatively simple and inexpensive to manufacture, operate and service.

Figure 1:
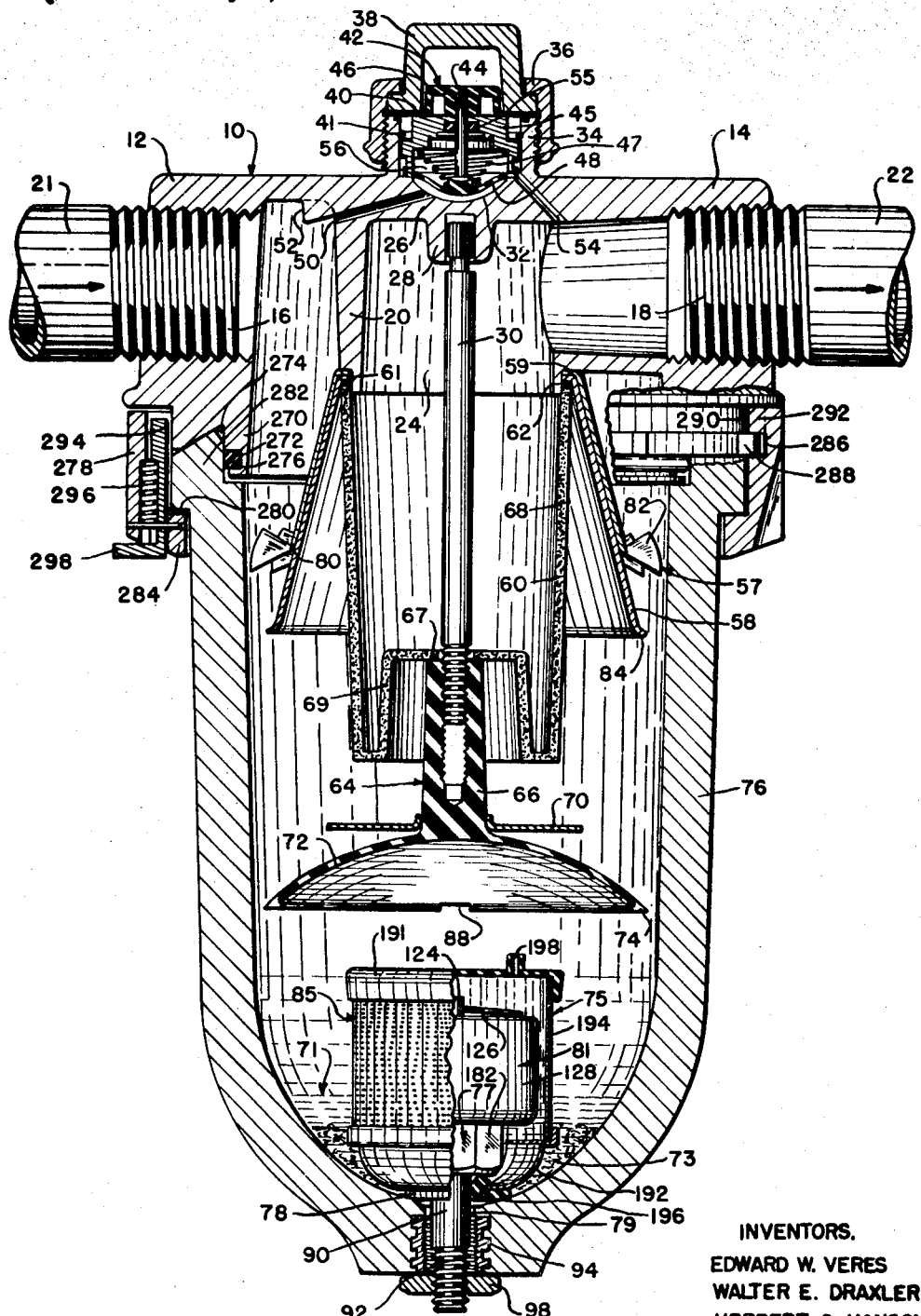
Figure 2:
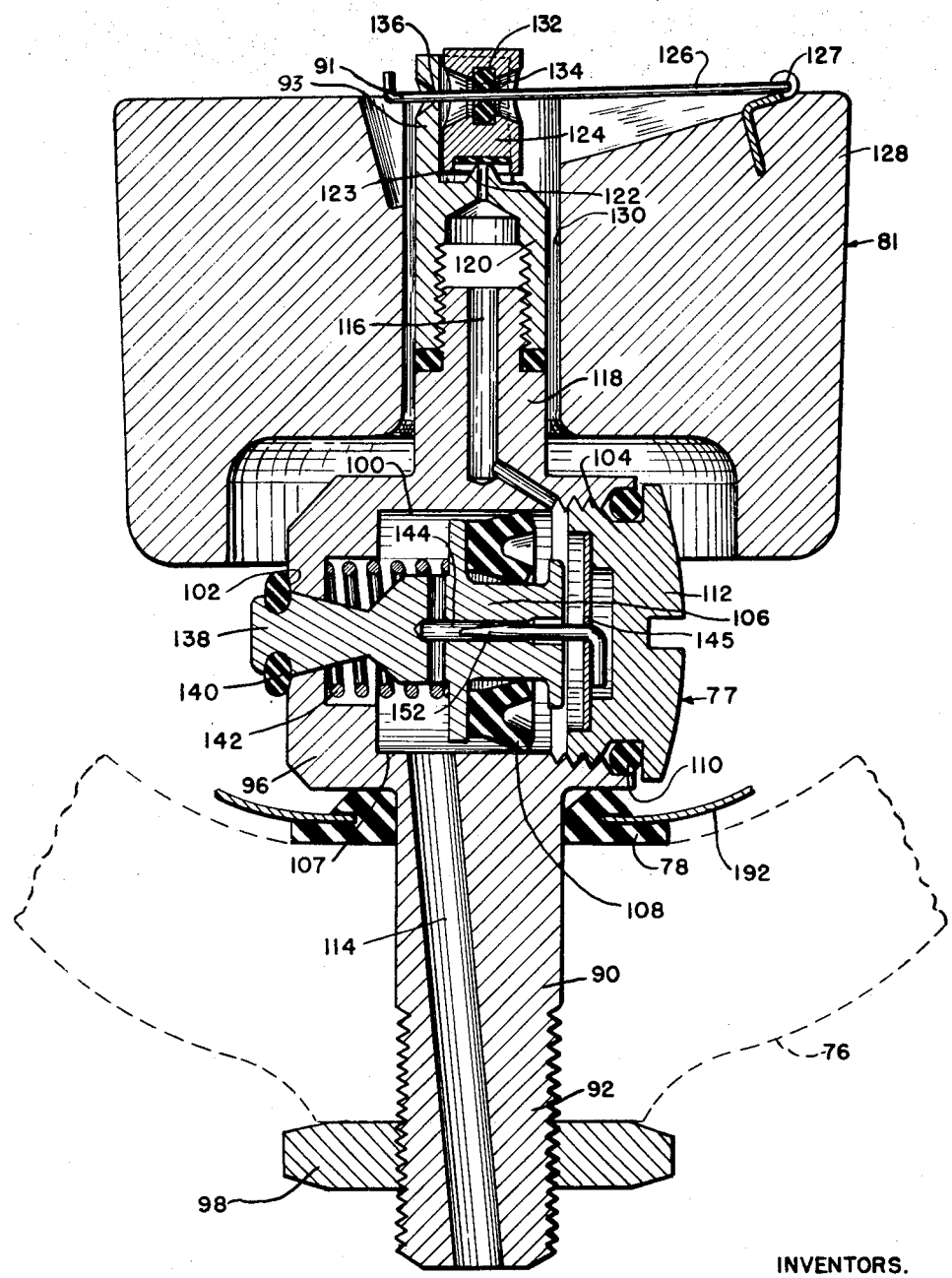
Figure 3:
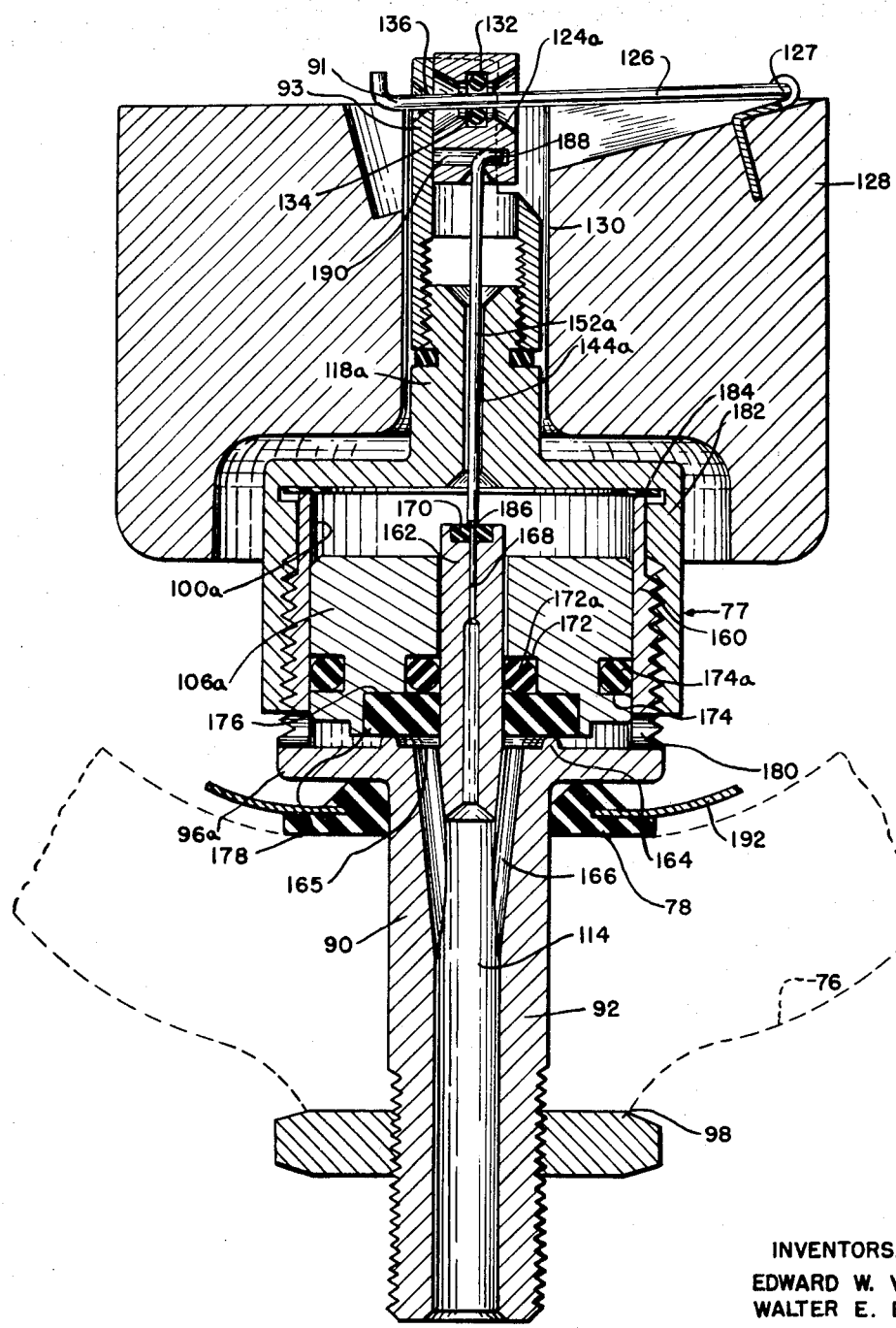

Further objects and advantages of the present invention will be apparent from the following description and a drawing relating thereto in which:

FIG. 1 is a vertical sectional view taken along the center line of a device embodying the invention, FIG. 2 is a vertical section taken through the automatic drain device embodying a preferred form of the invention where pressure is applied to actuate the drain valve, and FIG. 3 is a view similar to FIG. 2 showing a modification of the invention in which applied pressure is released to actuate the drain valve.

In the present invention all of the compressed air passing through an air line is subjected to a purification involving passage through a filter element of sintered bronze to accomplish multiple actions. An improved centrifugal action is imparted to the air for separation of heavier particles and the accumulation of undesirable liquids, and an improved sintered bronze conical filter element with its working length reversely doubled upon itself catches all dust that is too light to centrifugate. In event the filter element becomes undesirably obstructed with dust, the need for cleaning it is visually indicated automatically without any loss of compressed air and without any danger of the indicator being reset without the filter element being serviced. Accumulated water and foreign particles are automatically jettisoned from the accumulating bowl. A screen cage prevents fouling of the float and ejection valve with large particles. The filter device is protected against tatmpering while under pressure but can be readily cleaned in event debris large enough to clog small passages is collected. Moreover, only a predetermined limited amount of compressed air is lost in the operation of the automatic discharge.

Referring now to the drawing in further detail, a body 10 is provided at its top with aligned bosses 13 and 14 having threaded inlet and outlet openings 16 and 18, respectively, receiving an inlet nipple 21 and an outlet nipple 22 of a compressed air line. A downwardly extending cylindrical flange 20 is centrally located on the bottom side of the body to baffle the incoming air downwardly along the outside of its walls and in turn the flange permits outgoing air to pass to the outlet opening 18 through its open lower end 24. The cylindrical flange 20 is closed at its upper end by a wall 26 having a depending boss 28 thereon that is centrally cored out to receive a mounting stud 30.

The upper face of the wall 26 is depressed to form a cavity 32 which is bordered by an upstanding flange 34 externally threaded to receive a flanged retaining ring 36 that releasably holds a transparent dome member 38 in place. The dome member 38 in turn marginally engages the top of the circular flange 34 in sealed relationship and extends inwardly at 40 to provide a shoulder which along with a C-ring clamp 41 the indicator assembly 42 is held in place within the flange 34. The indicator assembly includes an inverted cup 45 that slidably supports a pin 44 which carries an indicator head 46 for viewing inside the dome. The indicator head 46 is preferably provided with a luminous color for commanding color detection. In its resting position the indicating head 46 is out of sight below the dome ring 36 but when the pin 44 is forced upwardly it carries the indicating head 46 to the upper part of the dome where it is quickly visible from all directions.

The lower end of the inverted cup 45 engages and holds in sealed relationship the margins of a snap-acting neoprene diaphragm 48 which is molded to normally assume a spherical shape so that in its resting position it resides in the cavity 32 with the head 46 out of horizontal sight in the dome. When the diaphragm 48 is moved upwardly, compressing the spring 47, it carries the pin 44 with it through an O-ring 55 that serves to frictionally support the pin and head 46 in the raised visible position and also dampens the movement of the pin 44 against responding to momentary differentials of pressure as where the use of air from the outlet is shut down and suddenly resumed. If the air pressure is removed from the air line to clean the filter the spring will return the diaphragm downwardly, and although the spring could engage the head of the pin to reset the indicator at the same time, it is preferred to let the pin and head remain in the up position without the pin and head being connected to the diaphragm so that the head remains up until reset, manually when the filter is cleaned.

For purposes of actuating the diaphragm a conduit 50 interconnects the inlet 16 and the cavity 32 below the diaphragm 48 while a deflecting ear 52 in the inlet protects the mouth of the conduit 50 against the direct force of incoming air under pressure. A second conduit 54 interconnects the space 56 above the diaphragm 48 through the wall of the cup 45 with the outlet 22 so that when a predetermined differential is reached between the air inlet and the outlet pressures, the higher pressure in the cavity 32 will force the diaphragm 48 upwardly to carry the indicator 46 up where it can be seen to indicate that there is an undesirable drop of the pressure on the air passing through the filter.

Thus, in event the filter becomes clogged with dust to such an extent that its efficiency is materially reduced, a pressure drop develops in the outlet side which is effective through the passage 54 to actuate the diaphragm 48 to raise the indicator 46 to indicate such conditions, and, this indication cannot be successfully reset until the filter is cleaned. Whereupon as will be explained later, the filter can be quickly removed and purged and the dome 38 removed by removal of the dome ring 36 so that the indicator may be manually reset to its original position for resumption of clean operation.

The lower end of the circular boss 20 is externally reduced marginally at 61 to provide a shoulder and receive in assembled relation thereagainst, first a vane baffle 57, a deflector baffle 58 and a porous filter element 60 in stacked array. Both baffles have the same wall inclination. Suitable nesting flanges 59 upon the baffles are provided at their upper edges to receive the upper edge of the filter element 60 which is coated with a dipped rubber seal 62 bonded thereon to maintain the filter element 60 out of electrical contact with any metal. Such provides not only a seal against the passage of dust therepast but also prevents any galvanic action that could otherwise deteriorate the filter.

The assembly of baffles and filter is held in place by a dielectric filter shield assembly 64 having a boss 66 threaded to the lower end of the stud 30 and engaging at 67 the filter element in a direction of movement urging it into clamped relationship with the circular boss 20.

It is to be noted that the filter element has an elongated conical frustum outside wall surface 63 like an umbrella and an upwardly tapering conical frustum inside wall 69 which can be made with any further length desired if corrections in the length of the stud 30 and boss 66 are made to accommodate same. This arrangement increases the flow area through the filter quite materially over that which would be present with a single wall extending the same distance downwardly.

The lower end of the filter shield comprises a radial flange element 70 centrally flanged and press fitted on the boss 66. Below the flange 70 a baffle element 72 is integrally provided defining a segment of a sphere with downwardly inclined edges 74 terminating in close proximity to the wall of an accumulator bowl 76. Castellations 88 in the edge 74 of the baffle 72 permit centrifugated particles to drop into the bottom of the bowl and, when the bowl is removed, the baffle element 72 provides a hard grip by which the filter element 60 can be quickly removed and replaced with a clean one within the comprehension of unskilled labor.

Referring again to the baffles 57 and 58 a radial flange 80 at the lower marginal edge of baffle 57 is provided with inclined propeller-type vanes 82 which swirl substantially all of the air passing through the filter downwardly and around the inside wall of the bowl 76. This swirling action is accelerated by the externally flared flange end 84 at the bottom of the baffle 58 which confines the air to the wall of the bowl like an annular jet port. Any particles present in the swirling air are thereby heavily centrifugated helically against the wall in a downwardly direction with sufficient force that their inertia carries them to the edge 74 of the baffle 72 where they drop into the lower part of the bowl through the castellations 88.

Thus, it will be seen from the disclosure that before the compressed air is passed through the electrically isolated sintered bronze filter 60, it is passed downwardly through peripheral vane blades contiguous to a circular wall which centrifugates the air with a violent rotary motion along the wall past a conical deflector at a level well down on the filter. Moreover, the baffles not only shrout the major length of the filter element, but their lowest marginal edge is flared outwardly in closely spaced relationship with the circular wall to assure that the centrifugated air reaches the spherical slope of the domed element 72 near the circular wall before contacting the filter. From there the centrifugated particles and liquids pass through the castellations to permit foreign debris to be collected in the bottom of the bowl before the air can begin to approach the filter. Debris that might not reach the castellations immediately are trapped by the radial disc 70 tangent to the dome element and this also causes air to flow back over the sides of the bowl. Otherwise the filter is as wide open in its exopsed area as possible and substantially free of any sharp current of flowing air reaching it until the debris laden portions have encountered two acute angle corners into which any remaining debris is driven by inertia when air is redirected in its flow pattern. Moreover, below the sphercal segment 72 with the flow pattern described the air is rather quiescent and it will be observed from the description which follows that with water 71 present to a moderate depth, the debris 73 becomes wet and sinks along the walls to collect at the bottom with minimal disturbing turbulence for co-operation with the rest of the structure which will now be described.

Shielded below the baffle 72 from any disturbing flow of air is located an automatic float actuated liquid drain device 85 which includes a screen assembly 75, a float arrangement 81, a valve arrangement 77 and an assembly grommet 78 which serves as a common seal at the bottom of the bowl 76 around an opening 79 through the bottom thereof.

More particularly, the drain device 85 comprises an elongated element 90 externally threaded at its lower end 92 which extends through the opening 79 defined by a metal collar 94 embedded in the bottom of the bowl 76. The lower end 92 is firmly secured in erect relationship and the sealed relationship just described in connection with grommet 78 is maintained by a nut 98. Above the gasket 78 the member 90 is enlarged to provide a body portion 96 (see FIG. 2) having a horizontal cylindrical cross bore 100 therethrough terminating at one end in a small opening defining an external valve seat 102 opening into the interior of the bowl 76 and a large threaded opening 104 at the other end which is closed by a bonnet plug 112 as sealed therewith by an O-ring 110. A piston 106 is slidably mounted in a large cylindrical portion 107 of the cross bore 100 for movement towards and away from the valve seat 102 in sealed relationship therewith by a V-ring seal 108 carried by the piston. The valve side of the piston is vented to the atmosphere through a conduit 114 extending through the lower end 92 and opening downwardly outside of the bowl. The opposite side of the piston 106 is in communication with a passage 116 formed in a boss 118 on the upper side of the body 96.

The piston 106 has a tapered valve element 138 of a diameter much smaller than the diameter of the piston and is grooved to receive an O-ring valve seal element 140 that is normally held closed against the valve seat 102 as urged by a compression spring 142 bearing against the piston. Thus, whenever the piston 106 is driven to the left as viewed in FIG. 2 as driven by air pressure, it carries the O-ring 140 away from the valve seat 102 to permit liquid 71 and foreign particles 73 in the bowl 76 to be ejected through the conduit 114 by the air pressure in the bowl.

The piston is moved to open the valve 138 by air under pressure being supplied from the bowl through a passage 122 in a valve body 120 that is threaded to the upper end of the boss 118. At its upper end the passage 122 terminates in a valve seat 123 that is closed by a valve head element 124 actuated by a float driven lever 126 whenever the liquids in the bowl reach a predetermined level. In providing this actuation one end of the lever 126 is pivoted at 127 to a float 128 and for purposes of multiplying the work effort of the float, said lever 126 is preferably arranged to be a No. 2 type lever system with a 7 to 1 mechanical advantage. The lever extends through an aperture at 132 having an O-ring 134 at a work point beyond which there is a minimal length arm 91 fulcrumed to the body 120 on an ear 93 as supported in a bore 136.

The float is provided with a central bore as at 130 so that it moves freely under buoyancy in a vertical guided relationship upon the boss 118 and valve body 120. The bore 130 being centrally located and of a diameter substantially less than its length, maximum buyoancy in minimum space is obtained without any cocking or binding of the float in its operation. Thus, as the float rises with an increasing level of accumulated liquid 71 in the bottom of the bowl 76, it moves the lever 126 upwardly with maximum leverage ratio against the O-ring 134 but since the passage 116 is at atmospheric pressure when the valve 124 is closed, as will be explained shortly, the air pressure in the bowl tends to hold the valve closed until the float has moved far enough upwardly to compress the O-ring 134 resiliently with enough force to lift the valve 124 to an open position whereupon both the float and the release of compression on the O-ring 134 causes the valve 124 to open a sufficient distance for sufficient length of time for a substantial discharge of liquid 71 from the bowl.

To accomplish this discharge of liquid, the valve 124, when opened, admits bowl pressure through passage 116 to the piston 106 thus forcing it towards the left as viewed in FIG. 2 to open the valve seat 102 as already described. Then when the level of the liquid 71 falls a predetermined distance, the valve 124 is again closed whereupon air pressure is cut off from the passage 116 and the spring 142 urges the valve stem 138 to carry the O-ring 140 into valve closing engagement with the valve seat 102.

To assist the spring 142 in closing and keeping the valve 140 closed in its resting position, a bleed passageway 144 is provided through the piston 106 to vent the pressure in conduit 116 to atmosphere through the conduits 114. Although this bleed passageway could be through a fixed wall portion of the body 96, it is preferred to locate it centrally in the piston where a self-cleaning pin 152 can be supported on a disc 145 for relative movement in the passage 144 as the piston 106 makes each excursion to open and close the valve 138. Not only does the pin 152 provide a moving element that keeps the bleed passage 144 free of foreign particles, but its uses enables a large bore to be provided which is easily drilled and a large diameter pin which provides a restricted bleed passageway therebetween of a limited capacity difficult to drill as a small open bore.

Thus, the valve 124 supplied with "flea power" provided by a small compact float 128 pilots the positive opening and closing of a drain valve 138 under and with the high air pressure differentials involved. Also the valve is self-cleaning in its action where disposed at the bottom of the bowl in direct contact with accumulated debris without the added protection of the screen assembly because the taper on the valve 138 makes sure that if a particle such as rust gets past the seat 102, it will clear all the way through. Furthermore, the fluid flow around the taper tends to center the valve element 138 in its operation.

Referring now to FIG. 3, another construction is shown but in this arrangement, where like numerals refer to like parts, the piston chamber 100a is symmetrically arranged for ease of tooling. Moreover, it is disposed vertically and under resting conditions the bowl pressure is applied to both sides of the piston 106a with the pressure on top thereof vented to atmosphere by the float 128 so that the pressure on the lower side lifts the piston and opens a valve controlled thereby to jettison liquid 71 from the bowl.

Structurally the housing 77 is an assembly of three parts, the lower one 96a comprises an externally threaded cylindrical flange 160 having an upright boss 162 centrally therein provided with a bleed passage 168 therethrough having a resilient valve ring seat 170 at the top thereof. At its base the boss is surrounded by a valve seat land 164 and openings 165 are provided within the confines of the land for passages 166 which along with passage 168 lead to the atmosphere through conduit 114.

The piston 106a slides in guided relation upon the boss 162 and preferably has internal and external annular grooves 172 and 174 in which O-rings 172a and 174a are disposed to engage the walls of said boss 162 and chamber 100a, respectively, in slidable sealing relationship. O-rings are preferred but can be dispensed with if desired.

Below the O-ring 172a and in a cavity 176 provided for the purpose is pressed a valve disk 178 which engages the valve land 164, and apertures 180 are provided around the bottom of the flange 160 through which liquid and debris can flow from the bowl 76 into the bottom of the chamber 100a and be ejected therefrom through passages 166 when the piston 106a is raised.

An inverted cup 182 is internally threaded and received on the flange 160 and secured in sealed relationship therewith by a circular gasket 184. Extending upwardly from the top of the cup is a guide boss 118a for the float having a bleed passage 144a therethrough in which a self-cleaning pin 152a is received to make of the passage 144a restricted bleed passage. The pin also carries on its lower end a valve element of 186 which closes against the valve seat 170 when the float 128 is in its lower position. The upper end of the pin is crooked as at 188 to be loosely received in a support slot 190 on the bottom of the head element 124a. The relative bleed areas for the passages 144a and 168 in relationship to the area of the piston exterior of the valve land is such that as long as the valve 186 is open, air will bleed from the chamber 100a much faster than air entering through the bleed passage 144a. Thus, sufficient pressure drop is quickly attained above the piston for it to be raised by the bowl pressure below it and when the float again closes the valve 186 there will be some overrun on liquid ejection due to a slight delay in the closing of the piston against the valve. The overrun, however, is terminated rapidly. The aspiration of liquid and the pressure drop within the land area assist the pressure that is increased above the piston when the valve 186 is closed.

In both embodiments, it will be observed that the drain traps 85 are preferably protectively enclosed in a screen assembly shiled 75 (FIG. 1) which comprises upper and lower facing cup members 191 and 192, respectively, axially flanged marginally to receive in snugly supported relationship a cylindrical screen member 194. The lower cup member 192 is apertured at 196 to be received in a circumferential groove on the resilient grommet 78 while the upper cup has an upright apertured nipple 198 thereon for venting the screen assembly to assure equalization of pressure inside and outside of the screen assembly with little chance of particles of debris entering therethrough.

The embodiments can be readily assembled and disassembled for servicing. The cup 191 is removed and the drain trap is slipped into the position shown through the grommet 78. The cup 191 is returned to position and the lower end 92 is slipped through the opening 79 in the bottom of the bowl 76. The nut 98 is then applied and tightened into place.

The bowl is then readily slipped into place against its supporting shoulder and readily secured by the ring and bayonet attachment structure which includes interdigitating flange segments locked in their closed position by a latch on one element engaging between the flange segments on the other portion more fully described in the copending application Ser. No. 272,991, now Patent No. 3,214,054 which is hereby incorporated by reference.

Briefly, it is preferred to remove the bowl by actuation of a quickly manipulated retainer ring for a ready flush out when the collection of debris in the bottom warrants it during an airline shutdown time and return it immediately to place with the ring snapped again into place. This is accomplished with a joint of axially telescoping wall members sealed by a radially acting seal and a quick disconnect releasably maintaining the joint between the bowl 76 and the body 10. The joint comprises a downwardly extending annular flange 270 having a external O-ring groove 272 therein is provided upon the bottom of the body 10. The upper end of the bowl 76 is offset outwardly to provide a cylindrical surface 274 which telescopes over flange 270 with sufficient clearance that it can be readily attached and removed. An O-ring 276 in the groove 272 seals the joint against escape of air under pressure.

The quick disconnect comprises a quick attached and detached ring 278 having an inwardly extending flange 284 which engages below and supports, a peripheral flange 280 provided on a shoulder 282 bordering the rim of the bowl when locked in a position to do so by a locking arrangement in which an internal groove at 286 on the ring mates with annular male flange segments 288 upon the body 10 and a groove 290 on the body 10 mates with annular female segments 292 located adjacent to the upper edge of the ring 278. The flange segments 286 and 292 serve in the nature of bayonet joint elements since the segments in one member slip between the segments in the other member so that they come to rest in the cooperating grooves as described whereupon a slight turning of the ring brings the segments into axial abutting relationship to support the bowl 76 against downward movement.

For purposes of ready engagement and disengagement, the tolerances are quite large and the segments can be engaged or disengaged by relative rotation in either direction. However, to lock the segments against rotation out of said abutting relationship, an axially movable latch 294 carried by the ring 278 in a space between two of the segments 292 on the ring is urged by spring 296 to intersect the groove 286 in the ring 278 between two of the segments 288 on the body. The lower end of the latch has a radial lip 298 thereon serving as a manual means for operating the latch.

Assuming the bowl 76 has been cleaned, the ring 278 is slipped into place over the bottom of the bowl and the bowl is raised to its telescoping sealed relationship with flange 270 on the body 10. After this the ring is moved upwardly and rotated slightly until the flange segments interdigitate whereupon one of the flange segments 288 comes into engagement with the upper end of the latch 294. Further upward movement of the ring depresses the latch to locate the flange segments in their respective mating grooves whereupon the ring is turned until the latch snaps upwardly between two of the flange segments 288 on the body 10. This deposes the segments in abutting relationship for supporting the bowl 76 against removal. While pressure is present in the bowl, the engaged flange segments are heavily loaded frictionally to prevent inadvertent rotation and disengagement. Moreover, it will be observed that the latch can be received between any two adjacent segments 288 which permits orientation for accessibility of the latch a full 360° around the lubricator. When removing the bowl with the air pressure "off," the latch 294 is pulled downwardly by its radial lip 298 to clear the body segments 288 and a slight twist of the ring interdigitates the segments so that the ring 278 can be lowered and the bowl 76 with it. During engagement or disengagement thereof the ring and latch can be managed with one hand.

What is claimed is:

1. An air line filter drain trap comprising a liquid accumulator bowl confining air under pressure therein and having a drain opening in the bottom, a housing in the bottom of the bowl having a chamber above said opening, said housing including a vertical elongated element extending through said opening and having a conduit means therethrough which includes passages connecting said chamber with the atmosphere, one passage opening in the top and the other passage opening in the bottom of said chamber, a boss carried by said housing having a passage connecting said chamber to said bowl, a float having a central portion adapted to slide vertically on said boss, a lever attached at one end to the float and at the other end extending inward across said central portion therefrom, a valve element closing said one passage of said conduit means and actuated by said float and lever to open said one passage for bleeding air under pressure from the chamber through the conduit means, ejection valve means for discharging liquid through said other passage of said conduit means to the atmosphere including a pressure actuated piston reciprocable in said chamber, means for admitting bowl pressure to one side of said piston for opening said valve when the float actuated valve element is open, a screen assembly for enclosing said float and housing, a sealing grommet disposed between said housing and bowl and having a groove therein receiving the lower marginal edges of said screen assembly in supported sealed relationship, a closure for the top of the screen assembly above said float having an upwardly extending vent therein.

2. An air line filter drain trap comprising a liquid accumulator bowl having air under pressure therein and a drain opening in the bottom, a housing means mounted in the bottom of the bowl and defining a chamber above said opening, said housing including piston means reciprocably mounted in said chamber and dividing the chamber into upper and lower spaces, said housing including a depending elongated element extending through and closing said opening and having a conduit means defining a lower passage section connecting one space of said chamber through an ejection valve seat to the atmosphere and a bleed passage section connecting the other space of the chamber to the atmosphere, boss means having a bleed passage section connecting said other space of said chamber to pressure in said bowl, a float having a central portion adapted to slide vertically on said boss means, valve means in one of said bleed passage sections actuated by said float member and coacting with the other bleed passage section to alternately apply full bowl pressure to and vent pressure from said other space to reciprocate said piston means, a valve disk actuated by movement of said piston means to open and close said ejection valve seat, aperture means for applying bowl pressure to said one space against the piston means over an area around said ejection valve seat to actuate said piston means to open said ejection valve seat when the float actuated valve means opens said one bleed passage section, said one bleed passage restricting the flow of air between said spaces to retard movement of said piston means in the direction closing said ejection valve seat when said float actuated valve means closes.

3. In an air line filter, a body having inlet and outlet openings and a bowl covering them having a drain opening through its bottom, a porous filter disposed between said openings to define an inlet zone in said bowl, baffle means for separating and trapping foreign matter and liquid carried by the air through the inlet zone including a baffle below said filter definiing a quiescent zone in the bottom of the bowl, drain means disposed in said quiescent zone comprising a housing having a vertically disposed chamber below said baffle and piston means reciprocable in said chamber responsive to pressure differentials therein, a first bleed passage means connecting one end of the chamber to the interior of said bowl, a conduit at the other end of the chamber extending through said drain opening and connecting the chamber to atmosphere through a passage section having an upwardly opening drain valve seat of predetermined flow area disposed below the level of liquid in said bowl, valve means including a valve disc reciprocably controlled by said piston means to coact with said drain valve seat, said piston means being exposed to bowl pressure on one side through said bleed passage conduit over an area greater than said predetermined area for holding said drain valve seat closed and on its other side to atmospheric pressure within said predetermined area through said conduit and passage section for closing said drain valve seat, aperture means in said housing subjecting said piston means to bowl pressure at all times on said other side over an area outside of said drain valve seat for opening said drain valve seat, a float carried by said housing responsive to the level of liquid in the bottom of the bowl, a second bleed passage connecting said one end of the chamber to atmospheric pressure, and a valve controlled by said float for opening and closing one of said bleed passage conduits for alternately applying bowl pressure to said piston means and venting said piston means to atmospheric pressure at said one side of said chamber for reciprocating the drain valve disk to open the valve seat and jettison liquid therefrom when said float opens said controlled valve.

4. The combination called for in claim 3 including a vertical boss in said chamber extending through said piston means and said second bleed passage extends through said vertical boss from the chamber portion on one side of the piston means to the chamber portion on the other side of the piston means.

5. The combination of claim 4 in which said float controlled valve includes a pin extending through said first bleed passage communicating with the interior of said bowl for reducing the flow capacity of the air through the first bleed passage below that of the second bleed passage.

6. The combination of claim 4 in which the piston means and disk is slidably mounted in sealed relation on the vertical boss and the area on the piston means exposed to bowl pressure around said boss is greater than that of said drain valve seat area exposed to atmosphere when the drain valve seat is closed.

7. An automatically emptied air line filter comprising a bowl in communication with the inlet and outlet of an intermediate section of an air line, a baffle defining a quiescent zone at the bottom of the bowl in which to collect liquid, housing means in said quiescent zone having a compartment in open communication at its lower end with the bottom of the bowl and including a verticle boss means below said baffle having a first passage connecting the chamber at its upper end to said bowl, and an elongated element having conduit means open to atmosphere at one end and at its other end including a bleed passage connecting said upper end of the chamber to atmosphere through a first valve seat and another passage connecting said lower end to atmosphere through a second valve seat, said second valve seat opening upwardly and having a flow area substantially less than the lower end area of the chamber, piston means carrying a valve disk of an area coacting with said other valve seat and reciprocably carried in guided relationship in said chamber and dividing said chamber into upper and lower chamber portions disposed in communication with said respective passages, a float having a central portion adapted to slide vertically on said boss means, a lever attached to one end to the float and at the other end pivotally to said boss means, a valve element controlled by said lever to open and close said first valve seat and control the pressure drop across said bleed passage means for reciprocating said piston means and valve disk.

8. The combination called for in claim 7 in which said elongated element has a vertical boss defining a cylindrical wall upon which said piston means is guided in sealed relationship for said reciprocation, said bleed passage being disposed in said vertical boss.

9. The combination called for in claim 8 in which said bleed passage is in axial alignment with said other passage communicating with said bowl, and said control valve element closing said first valve seat includes a flow restricting self cleaning pin extending through said bleed passage.

10. An air line filter drain trap comprising a liquid accumulator bowl having air under pressure therein and a drain opening in the bottom, a housing mounted in the bottom of the bowl having a piston chamber and piston element therein, said piston element and housing being reciprocable with respect to each other, said housing including a vertical depending elongated element extending through said opening having an ejection conduit opening within an ejection valve seat connecting one end of said piston chamber to the atmosphere, a first upstanding boss having a bleed passage therethrough connecting the other end of the piston chamber to the atmosphere through said ejection conduit, a second upstanding boss having a passage of restricted flow area connecting said other end of the piston chamber to the atmosphere through said ejection conduit, a control valve seat on one of said bosses, a control valve element for closing said control seat, a float having a central portion adapted to slide vertically on said first boss and responsive to the level of liquid in said bowl to actuate said control valve element, said piston element being disposed in said piston chamber between said valve seats, an ejection valve disk between said piston element and ejection valve seat closing against said ejection valve seat by reciprocable movement between said piston element and housing when said control valve is closed, and aperture means admitting bowl pressure between said piston element and housing around said valve disk for opening said ejection valve seat to eject liquid in the bowl through said ejection conduit to atmosphere when the control valve element is opened by the float.

11. In an air line filter, a body having inlet and outlet openings and a bowl covering them, a porous filter disposed between said openings to define an inlet zone in said bowl, baffle means below said filter for separating and trapping foreign matter and liquid carried by the air through the inlet zone and defining a quiescent zone in the bottom of the bowl in which to collect liquid, drain means in said quiescent zone comprising a housing having a chamber in communication with the bottom of the bowl and including a vertical elongated element below said baffle having a conduit means through it, a vertical boss in the chamber, said conduit means being open to atmosphere at one end and having a first passage section through the vertical boss communicating with the chamber in an upwardly opening valve seat at its upper end and a second passage section communicating with said chamber below the level of liquid in said bowl, piston means slidably mounted on the boss in sealed relation in the chamber and carrying a valve disk cooperating with said valve seat, the piston means being exposed to bowl pressure on both sides except for the valve seat area which is exposed to atmosphere through the valve seat when the valve seat is closed, the area of the piston means around the valve seat being exposed to bowl pressure is urged thereby to open said valve seat, a bleed passage means disposed in said vertical elongated element and in axial alignment with said first passage section and its valve seat, a valve element for opening and closing the valve seat of said first passage section for venting the chamber portion above said piston means to atmosphere to move the piston means and open the valve seat to jettison liquid therefrom, a float carried by said housing and having a central portion adapted to slide vertically on said elongated element responsive to the level of liquid in the bottom of the bowl, a lever attached at one end to the float and at the other end pivotally to said elongated element, a flow restricting pin interconnecting said lever and control valve element extending through said first passage section and controlled by said float actuated lever to actuate said valve element to control the pressure differential across said piston means for reciprocating same.

References Cited

UNITED STATES PATENTS

| | | | |
|---|---|---|---|
| 446,014 | 2/1891 | Popp | 55—219 |
| 495,059 | 4/1893 | Reasoner | 137—195 |
| 673,250 | 4/1901 | Ford | 137—415 X |
| 758,965 | 5/1904 | Gulland | 137—415 X |
| 779,772 | 1/1905 | Donnelly | 137—415 X |
| 811,420 | 1/1906 | March | 137—415 X |
| 1,738,809 | 12/1929 | Walter | 137—194 X |
| 2,348,757 | 5/1944 | Samiran | 210—54 |
| 2,376,623 | 5/1945 | Romberg | 137—434 X |
| 2,442,379 | 6/1948 | Samiran | 210—115 |
| 2,726,732 | 12/1955 | Faust et al. | 55—219 |
| 2,894,600 | 7/1959 | Veres | 55—426 X |
| 2,914,086 | 11/1959 | Beller | 55—309 |
| 2,999,509 | 9/1961 | Hankison et al. | |
| 3,257,783 | 4/1963 | Baker et al. | 55—219 |
| 1,948,543 | 2/1934 | Samiran | 210—115 |
| 2,852,291 | 9/1958 | Hults | 210—450 X |
| 3,259,247 | 7/1966 | Tietz | 210—444 |
| 3,378,993 | 4/1968 | Veres et al. | 55—219 |

HARRY B. THORNTON, Primary Examiner

D. E. TALBERT, JR., Assistant Examiner

U.S. Cl. X.R.

55—274, 337, 391, 421, 426, 429, 432, 449, 457, 502; 137—194, 415; 210—90 304, 512; 220—40; 251—35